Jan. 22, 1952     W. H. WILLIAMS     2,583,246
REAMER FOR THE ROUGH ENDS OF TUBULAR MEMBERS
Filed Feb. 8, 1949
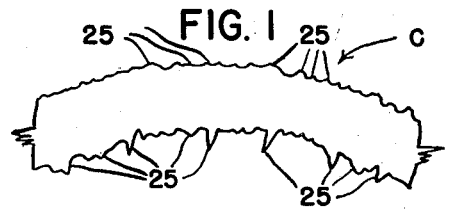
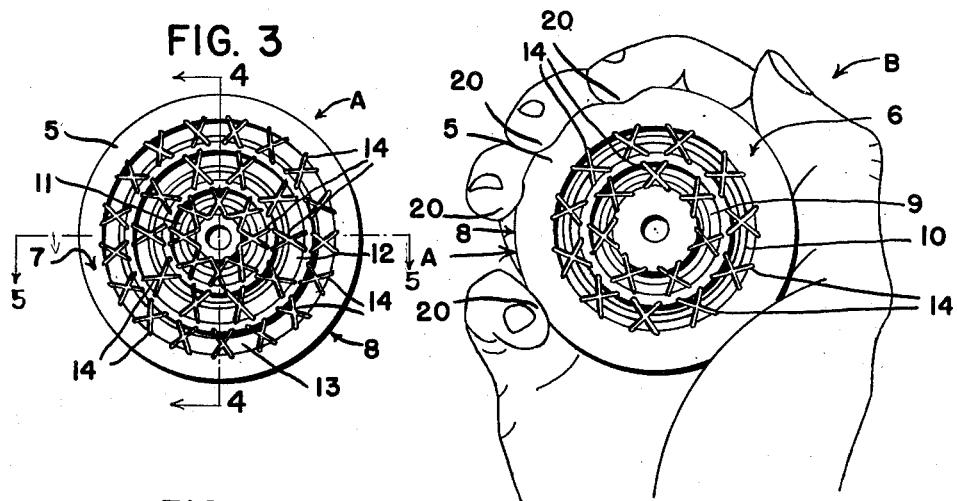
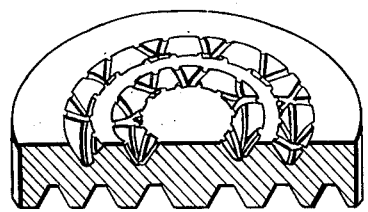
INVENTOR.
Willie H. Williams
BY *Lancaster, Allwine Pommel*
ATTORNEYS.

Patented Jan. 22, 1952

2,583,246

UNITED STATES PATENT OFFICE 2,583,246

REAMER FOR THE ROUGH ENDS OF TUBULAR MEMBERS

Willie H. Williams, Atlanta, Ga.

Application February 8, 1949, Serial No. 75,225

2 Claims. (Cl. 77—73)

This invention relates to reamers for removing the burrs from the ends of tubular members. For example, such a member may be a thin-walled, metallic conduit or tube employed in electrical wiring for enclosing conductors.

An important object of the invention is to provide a reamer of this kind which may be held in the cupped hand and, upon partial rotation of the tubular member or the reamer disposed at the end of the tubular member, will remove burrs, projections and the like caused by transverse cutting of the tubular member. The operation of the reamer will also tend to correct any minor deviations in the curve of the edge being operated upon.

Another important object is to provide such a reamer which comprises a member having opposite flat faces, which member may be held in the cupped hand and is provided with a plurality of concentric grooves in both faces.

A further important object of the invention is to so arrange the grooves that a relatively large number may be provided, without weakening the wall of the member.

Other objects and advantages of the invention will be apparent during the course of the following detailed description of the invention, taken in connection with the accompanying drawing, forming a part of this disclosure, and in which drawing:

Fig. 1 is a greatly enlarged fragmentary edge portion of a tubular member showing a plurality of burrs thereon.

Fig. 2 is a face view, of the new reamer, showing one face thereof, held in a cupped hand.

Fig. 3 is a face view of the opposite face of the new reamer.

Fig. 4 is a section, substantially on the line 4—4 of Fig. 3.

Fig. 5 is a view, partly in section and partly in perspective, taken on the line 5—5 of Fig. 3.

In the drawing, wherein for the purpose of illustration is shown a preferred embodiment of the invention and wherein similar reference characters designate corresponding parts throughout the several views, the letter A designates the new reamer, the letter B a hand of a user and C a tubular member to be operated upon by the new reamer A.

The new reamer A comprises a body portion 5, which is preferably a disc, having opposite, preferably flat, parallel faces 6 and 7, and a hand-gripping edge 8, which may be circular, and joins the faces 6 and 7.

Each face is preferably provided with a plurality of concentric grooves. For example, the face 6 may be provided with the grooves 9 and 10 and the face 7 with the grooves 11, 12 and 13. The grooves may be, looking at them transversely, generally truncated conical in shape, as may be seen in Fig. 4, having converging surfaces extending to a surface substantially paralleling the faces 6 and 7, or they may be substantially V-shaped, as the groove 13.

Each groove is provided with a plurality of serrations, being crossed ribs 14 which, preferably, extend over the converging surfaces as well as the flat surfaces of the grooves, providing cutting edges and cross at the bottoms of the grooves.

By referring to Fig. 4 it will be seen that no center (or bottom) of a groove in one face is directly opposite the center (or bottom) of a groove in the other face, despite the plurality of grooves provided, whereby the body portion 5 is not weakened as would be the case if the centers aligned. This permits the use of a relatively thin body portion 5.

There is provided an edge portion to each face 6 and 7 so that the tip portions of the fingers 20 of the hand B will clear the outermost groove 10 or 13.

Altho I do not desire to be limited to the specific measurements given, the diameter of the body portion 5 may be two and one-quarter inches, the width of the edge 8, three-eighths inch, and the edge portion of each face 6 and 7 between three-sixteenths and five-sixteenths inch wide.

When the reamer A is held substantially as shown in Fig. 2 and the end of a tubular member is inserted into a suitable groove therein, and the reamer A partly rotated (or, if desired, the tubular member partly rotated) burrs, similar to the enlarged burrs 25 on the edges of the enlarged fragment of a tubular member C shown in Fig. 1, will be removed by the cutting edges of the crossed ribs 14, leaving a smooth edge to the tubular member.

While not confined to thin-walled tubular members, such as thin steel or alloy tubing, it is particularly useful therefore, since it cannot distort the arc of the tubing edges and will tend to correct any minor deviations in the arc. This last is due to the crossed ribs 14, extending over the converging surfaces of the grooves and crossing at the bottoms of the grooves.

Various changes may be made to the form of the invention herein shown and described with-

What is claimed is:

1. A reamer, including a body portion provided with a substantially flat face, a circular groove extending into said body portion from said face, said groove having converging wall faces and a bottom, and a plurality of pairs of spaced-apart converging ribs, having cutting edges, extending over said wall faces and providing serrations, whereby when the end of a thin walled metallic tubular portion is inserted into said groove with the end edge of said tubular member and said cutting edges pressed together and one of said portions is rotated, said surfaces will ream said end.

2. A reamer, including a body portion provided with a substantially flat face, a circular groove extending into said body portion from said face, said groove having converging wall faces and a bottom, and a plurality of pairs of spaced-apart converging ribs, having cutting edges, extending over said wall faces and said bottom and providing serrations, whereby when the end of a thin walled metallic tubular portion is inserted into said groove with the end edge of said tubular member and said cutting edges pressed together and one of said portions is rotated, said edges will ream said end.

WILLIE H. WILLIAMS.

REFERENCES CITED

The following references are of record in the file of this patent:

UNITED STATES PATENTS

| Number | Name | Date |
|---|---|---|
| 387,555 | Cummings | Aug. 7, 1888 |
| 1,476,515 | Howard | Dec. 4, 1923 |
| 2,188,584 | Tyne | Jan. 30, 1940 |

FOREIGN PATENTS

| Number | Country | Date |
|---|---|---|
| 27,402 | Great Britain | Dec. 11, 1907 |